Jan. 8, 1952 G. L. RIECKEN ET AL 2,581,771
SHOE SOLE CUTTING OFF DEVICE
Filed Oct. 8, 1949 4 Sheets-Sheet 1

INVENTORS,
GEORGE LOUIS RIECKEN AND
GEORGE CARL RIECKEN,
By Herbert Q. Mintury,
ATTORNEY.

INVENTORS,
GEORGE LOUIS RIECKEN AND
GEORGE CARL RIECKEN,
By Herbert A. Minturn
ATTORNEY.

Jan. 8, 1952 G. L. RIECKEN ET AL 2,581,771
SHOE SOLE CUTTING OFF DEVICE
Filed Oct. 8, 1949 4 Sheets-Sheet 3

INVENTOR,
GEORGE LOUIS RIECKEN AND
GEORGE CARL RIECKEN,
By Herbert A. Minturn,
ATTORNEY.

Jan. 8, 1952 G. L. RIECKEN ET AL 2,581,771
SHOE SOLE CUTTING OFF DEVICE
Filed Oct. 8, 1949 4 Sheets-Sheet 4

INVENTORS,
GEORGE LOUIS RIECKEN AND
GEORGE CARL RIECKEN,
By Herbert A. Minturn,
ATTORNEY.

Patented Jan. 8, 1952

2,581,771

UNITED STATES PATENT OFFICE 2,581,771

SHOE SOLE CUTTING OFF DEVICE

George Louis Riecken and George Carl Riecken, near Evansville, Ind., assignors to Schnacke Manufacturing Corporation, Evansville, Ind., a corporation of Indiana Application October 8, 1949, Serial No. 120,344

2 Claims. (Cl. 12—17)

This invention relates to a device for cutting off a sole which has been ripped by its forepart from a shoe, whereby the cutting action is done in situ. A primary object of the invention is to provide a structure which will cut off the sole, normally a sole which has been worn and needs replacing such as is commonly done in half-soling, whereby the cut through the worn sole will be absolutely uniform laterally across the sole so as to make the cut on a bevel in a common plane. Heretofore all such cutting operations have been done by hand in the shoe repair shop with the result that the cut is not uniform entirely across the sole since there is nothing to guide the knife when operated by hand, and the result has been that in applying the new tap or half-sole, the lapping of that new tap over the cut results in an uneven appearance, and in fact leaves a terminal marginal edge which is easily lifted after usage following the completion of the repair.

A further primary object of the invention is to provide a structure which will be suitable for cutting off the worn sole regardless of its thickness, such for example as the thin sole of a woman's shoe or the heavier sole of a man's shoe, and still obtain a uniform, planar surface of the cut.

Further important objects of the invention are to be found in that the cutting line across the sole is visible to the operator at all times; the adjustment required for varying thicknesses of soles is had by simply turning a hand operated lever; ample room is provided for the shoe to be operated on so as to get the cut as far back on the base or rear end of the sole as may be desirable immediately ahead of the heel; ease of operation of the device; a relatively low cost of production of the device; and extreme durability of the structure embodying the invention.

Figure 1:
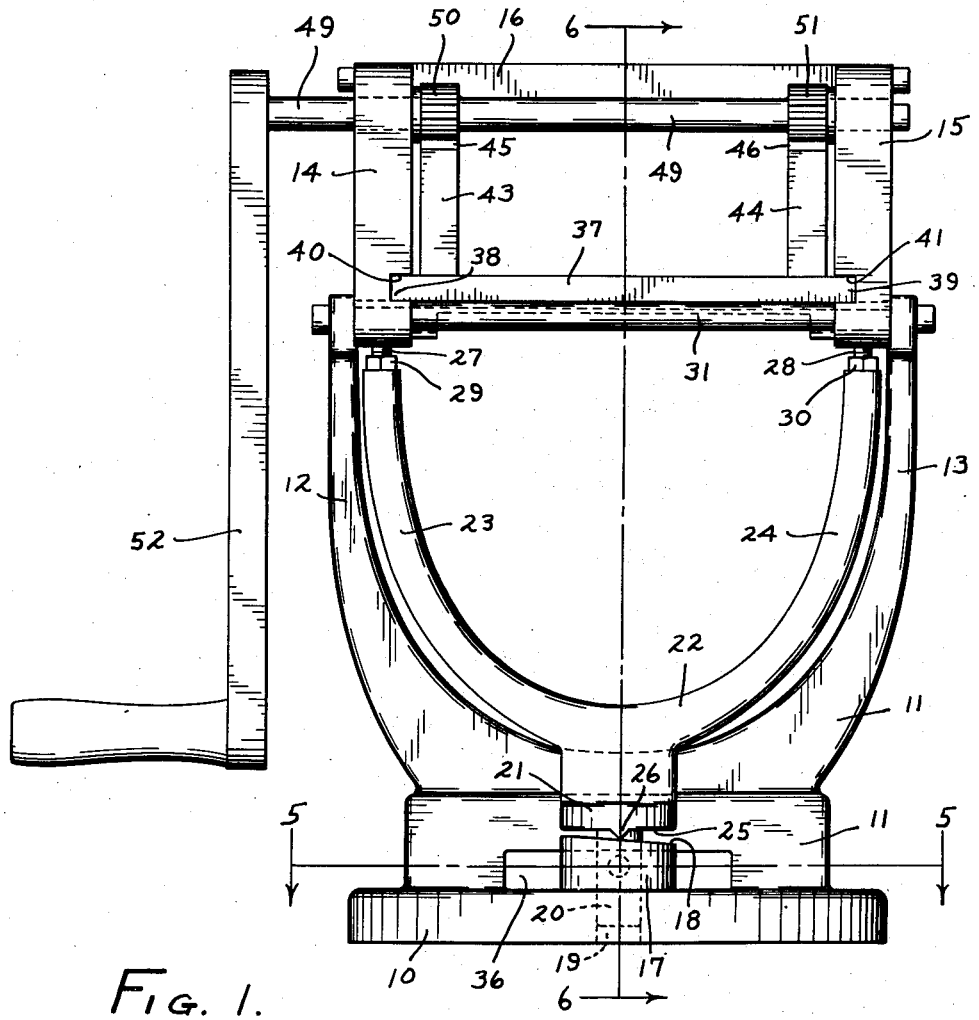
Figure 2:
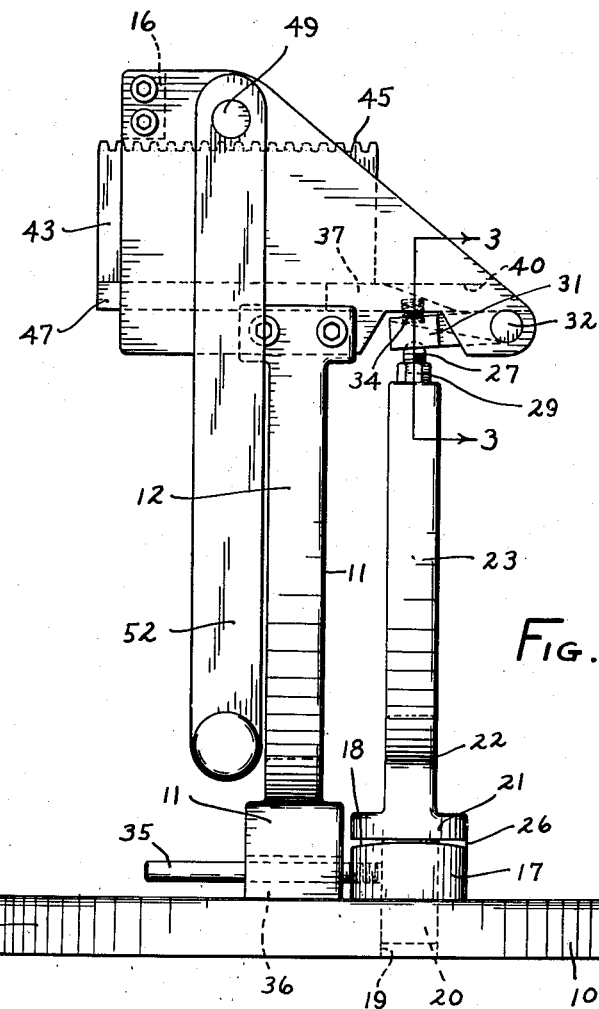
Figure 3:
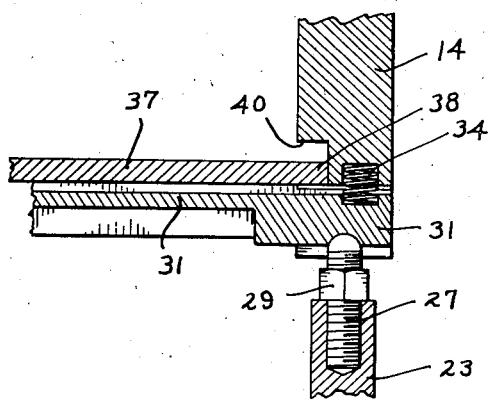
Figure 4:
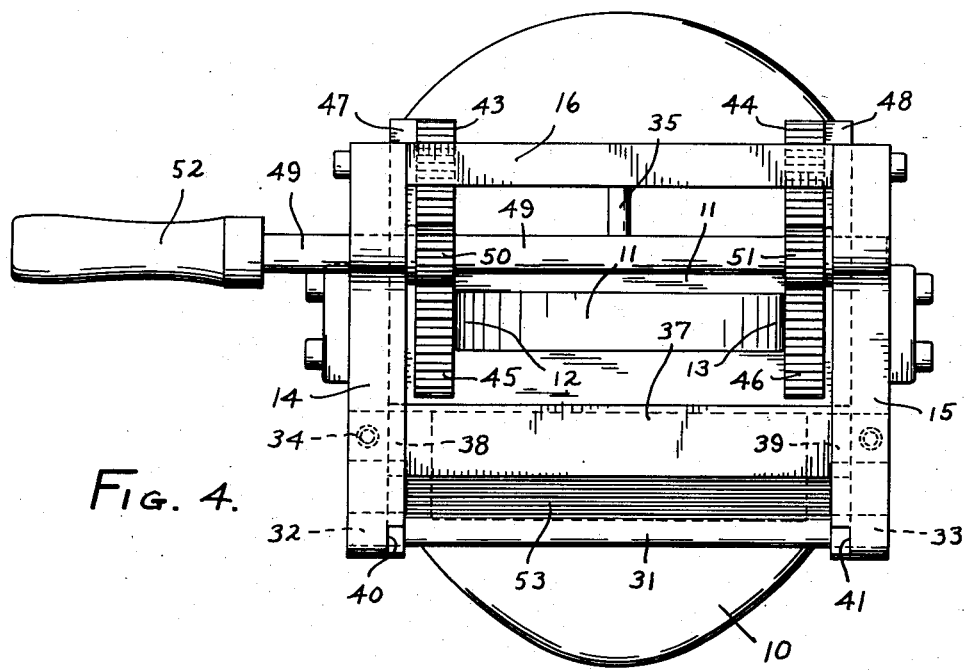
Figure 5:
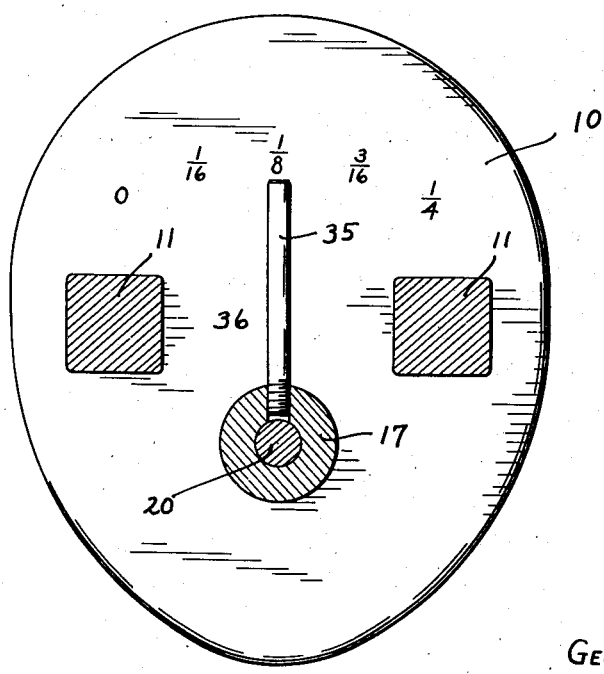

These and many other objects and advantages of the invention will become apparent to those versed in the art in the following description of one particular form of the invention as illustrated in the accompanying drawings, in which Fig. 1 is a view in front elevation of a structure embodying the invention;

Fig. 2, a view in side elevation;

Fig. 3, a detail on an enlarged scale in vertical transverse section on the line 3—3 in Fig. 2;

Fig. 4, a view in top plan;

Fig. 5, a view in horizontal transverse section on the line 5—5 in Fig. 1; and

Figure 6:
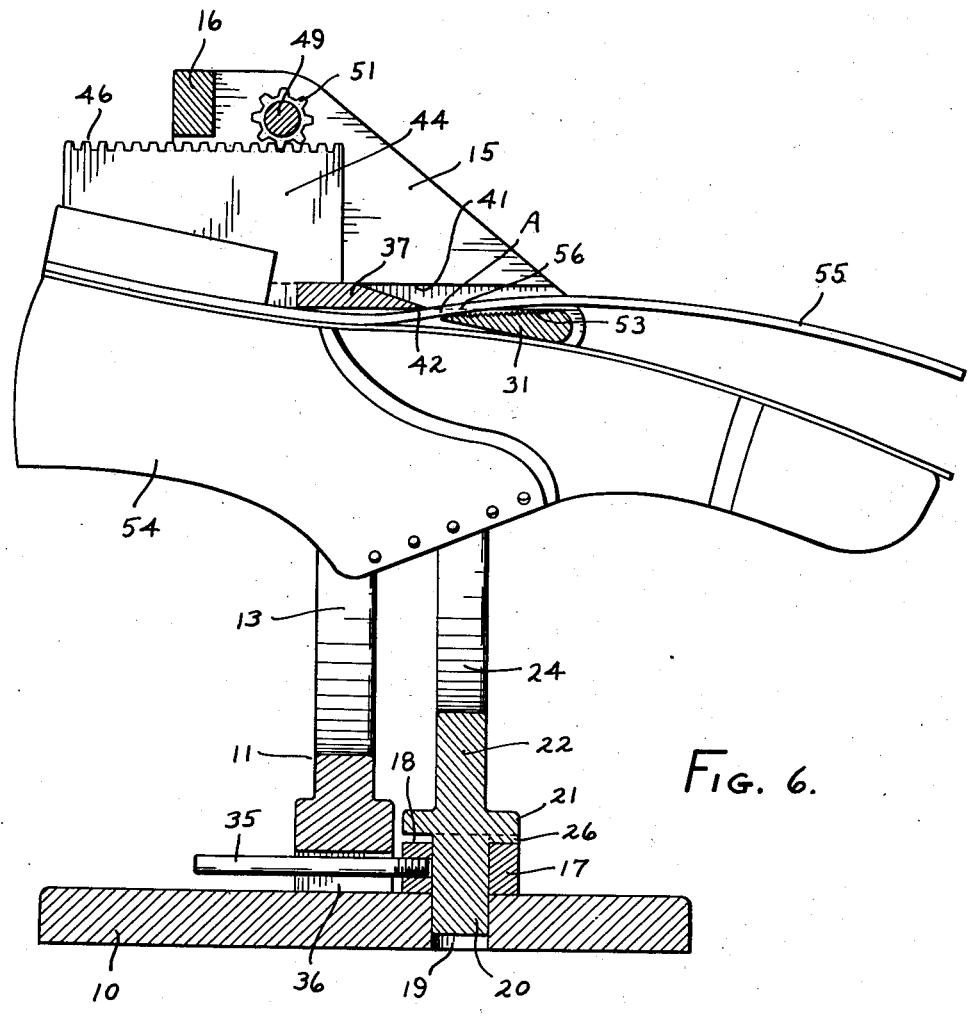

Fig. 6, a view in vertical longitudinal section on the line 6—6 in Fig. 1 with a shoe in operative position.

Referring to the drawings, in which like characters of reference indicate like parts throughout the several views, a base 10 is provided to carry thereon in a fixed manner an upwardly extending frame 11, herein shown as being generally U-shaped. This shape is provided by means of the two spaced apart arms 12 and 13 which extend from the lower portion of the frame 11. There is fixed rigidly to the upper end of these arms 12 and 13 the side frames 14 and 15 respectively. The upper rear end portions of these side frames 14 and 15 are preferably interconnected by means of a spacing bar 16.

Forwardly of the frame 11, there is positioned in a loose manner on the top side of the base 10, a cam sleeve 17 cylindrical in nature. This cam sleeve 17 has an upper surface 18 planar in nature, and inclined from the horizontal. A vertically disposed bore 19 extends through the base 10 and in a continuous manner upwardly and centrally through the cam sleeve 17 to open from the top surface 18 thereof.

A post 20 is carried within the bore 19 with a sliding fit and has fixed to its upper end the base 21 of a fork 22 which is provided with the spaced apart upwardly extending arms 23 and 24.

The base 21 is generally planar in respect to its under surface 25. From this surface 25, there extends downwardly on one side of the post 20, a tooth 26 which normally is in sliding contact with the inclined surface 18 of the cam sleeve 17.

On the upper ends of the arms 23 and 24 there is provided to extend therefrom respectively the adjustable studs 27 and 28, secured in adjustment by any suitable means, such as by the lock nuts 29 and 30. On the upper ends of these studs 27 and 28 there rests the rear end portions of a bed 31.

This bed 31 is rockably supported by end trunnions 32 and 33 rockably extending in longitudinal alignment through the extreme forward and lower end portions of the side frames 14 and 15. The bed 31 is yieldingly urged downwardly into contact with these studs 27 and 28 by any suitable means, such as by a spring 34, Fig. 3, interposed between the frame thereabove and the bed 31 therebelow.

A lever 35 is fixed to the boss or sleeve 17, Figs. 2 and 5, to extend rearwardly through a window 36 provided between the base 10 and the frame 11. By rocking this lever 35 horizontally, the cam sleeve 17 may be rotated about its axis, as defined by the post 20 extending therethrough so that the tooth 26 in contact with the surface 18 may be elevated or lowered in accordance with the degree of turning of the member 17. Thus the bed 31 may be raised and lowered depending upon the direction of rocking of the lever 35.

A cutting knife 37 is provided to be reciprocated horizontally between the frames 14 and 15. In the form herein shown, the opposite ends of the knife 37 designated by the numerals 38 and 39 are slidingly carried in fore and aft directions within the horizontally disposed slots 40 and 41 respectively provided in the opposing faces of the frames 14 and 15. These slots 40 and 41 are located in relation to the bed 31 so that the forward edge 42 of the knife 37 will be guided to just clear the forward end of the bed 31 when rocked downwardly to have its top surface inclined from the horizontal.

The knife 37 has extending upwardly thereof and within the space between the frames 14 and 15, in relatively close proximity thereto respectively the blocks 43 and 44, the top faces of which provide racks 45 and 46 respectively. The racks 45 and 46 are so positioned as to pass with clearance under the tie bar 16. As indicated, Fig. 4, these blocks 43 and 44 extend downwardly a distance to carry the feet 47 and 48 respectively to enter with a sliding fit the slots 40 and 41 behind the knife 37. In the form herein shown, these blocks 43 and 44 are formed integrally with the knife 37.

An operating shaft 49 is revolubly carried by the side frames 14 and 15 to have fixed thereon the pinions 50 and 51 meshing respectively with the racks 45 and 46. This shaft 49 extends horizontally and outwardly from the side frame 14 a sufficient distance to have mounted thereon an operating crank 52. Thus by turning the crank 52, the knife 37 may be reciprocated horizontally to approach and be withdrawn from the bed 31. The upper surface of the bed 31 is provided with knurls or serrations 53 in order to prevent slippage during the cutting operation.

To operate the device, a shoe 54 has the sole 55 ripped therefrom back a distance beyond the line at which it is desirable to be cut off in the repair operation. The shoe 54 is inserted by the toe end between the fork arms 23 and 24 in an upside down relation to have the sole 55 extend over the bed 31, and the shoe 54 is pushed forwardly in relation to the knife 37 which is then in a retracted position in respect to the bed 31, so that the zone A of the sole 55 across which the cut is to be made is brought up to the position where the forward edge 42 of the knife 37 will begin cutting into the sole 55 when the knife 37 is advanced theretoward. The lever 35 is shifted to that position which will bring the cut through the zone A over the bed 31 so that the bed 31 will support the sole 55 while the edge portion 42 passes therethrough. Then the crank 52 is turned to advance the knife 37 toward the zone A so that the cut will be made across the line designated by the numeral 56. Following this cutting operation, the crank handle 52 is then turned to retract the knife 37 from over the bed 31, and the shoe 54 may be withdrawn from the device and the new tap (not shown) placed on the shoe and attached thereto all in the usual and well known manner. By reason of forming the cut across the sole 55 to come on some such a line or plane as indicated by the numeral 56, a perfect bond may be made by the predetermined bevel provided on the tap with this surface 56 whereby to all intent and purpose the edge of the bond will not be apparent after the repair has been made.

While we have herein shown and described our invention in the one particular form, it is obvious that structural changes may be employed without departing from the spirit of the invention, and we therefore do not desire to be limited to that precise form beyond the limitations which may be imposed by the following claims.

We claim:

1. A device for transversely cutting off in situ shoe soles for replacement purposes comprising a relatively vertically rockable and horizontally disposed knife bed; a cutting off knife; side frames guiding said knife in a horizontal direction toward and away from said bed; means spaced above and to the sides of said knife for reciprocating it; and means supporting said bed and said knife to provide clearance thereunder of a shoe in upside down relation with the sole thereof passed under said knife and over said bed; said knife bed being rockably supported by its ends adjacent its side farthest removed from said knife; and means for rocking said bed, comprising a forked member having upper horizontally spaced arms presented under rear end portions of the bed, a post extending downwardly from the forked member, a base having a bore receiving said post, a cam sleeve circumferentially revoluble about said post between the base and the forked member, and a cam follower on said forked member.

2. A device for transversely cutting off in situ shoe soles for replacement purposes comprising a relatively vertically rockable and horizontally disposed knife bed; a cutting off knife; side frames guiding said knife in a horizontal direction toward and away from said bed; means spaced above and to the sides of said knife for reciprocating it; and means supporting said bed and said knife to provide clearance thereunder of a shoe in upside down relation with the sole thereof passed under said knife and over said bed; said knife bed being rockably supported by its ends adjacent its side farthest removed from said knife; and means for rocking said bed; comprising a forked member having upper horizontally spaced arms presented under rear end portions of the bed, a post extending downwardly from the forked member, a base having a bore receiving said post, a cam sleeve circumferentially revoluble about said post between the base and the forked member, and a cam follower on said forked member; said bed and knife supporting means comprising a U-shaped member having its upper arms fixed to said side frames and a base supporting said U-shaped member; said U-shaped member and said forked member being mounted in spaced apart parallel relation to provide said clearance therethrough.

GEORGE LOUIS RIECKEN.
GEORGE CARL RIECKEN.

REFERENCES CITED

The following references are of record in the file of this patent:

UNITED STATES PATENTS

| Number | Name | Date |
|---|---|---|
| 1,567,669 | Musacchia | Dec. 29, 1925 |
| 1,796,020 | Haberman | Mar. 10, 1931 |